US 8,695,021 B2

(12) United States Patent
Pierson et al.

(10) Patent No.: US 8,695,021 B2
(45) Date of Patent: *Apr. 8, 2014

(54) PROJECTING NATIVE APPLICATION PROGRAMMING INTERFACES OF AN OPERATING SYSTEM INTO OTHER PROGRAMMING LANGUAGES

(75) Inventors: Harold Pierson, Redmond, WA (US); Brent Rector, Redmond, WA (US); Martyn Lovell, Seattle, WA (US); Mahesh Prakriya, Redmond, WA (US); Stephen Rowe, Bellevue, WA (US); Tassaduq Basu, Redmond, WA (US); Robert A. Wlodarczyk, Issaquah, WA (US); Elliot H. Omiya, Kirkland, WA (US); Jerry Dunietz, Seattle, WA (US); Ales Holecek, Kirkland, WA (US); Lawrence W. Osterman, Woodinville, WA (US); Wei Zeng, Sammamish, WA (US); Neeraj Wadhwa, Kirkland, WA (US); Shakeel Solkar, Sammamish, WA (US); Michael Aksionkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/223,296

(22) Filed: Aug. 31, 2011

(65) Prior Publication Data
US 2013/0055292 A1 Feb. 28, 2013

(51) Int. Cl.
*G06F 3/00* (2006.01)
(52) U.S. Cl.
USPC .......................................... 719/328; 719/330
(58) Field of Classification Search
USPC .................................................. 719/328, 330
See application file for complete search history.

(56) References Cited

U.S. PATENT DOCUMENTS

| 5,339,422 | A  | * | 8/1994 | Brender et al. | 714/4.1 |
| 6,446,137 | B1 | * | 9/2002 | Vasudevan et al. | 719/330 |
| 6,691,302 | B1 |   | 2/2004 | Skrzynski et al. | |
| 7,171,539 | B2 | * | 1/2007 | Mansell et al. | 711/203 |
| 7,325,007 | B2 |   | 1/2008 | Castro et al. | |
| 7,380,235 | B1 |   | 5/2008 | Fathalla | |
| 7,546,607 | B2 |   | 6/2009 | Demsey et al. | |

(Continued)

OTHER PUBLICATIONS

Fadi Sandaklly, Distributed Shared Memory Infrastructure for virtual enterprise in building and construction, 2001.*

(Continued)

*Primary Examiner* — Lechi Truong
(74) *Attorney, Agent, or Firm* — Carole Boelitz; Leonard Smith; Micky Minhas

(57) ABSTRACT

Information about the operating system application programming interfaces is stored in a known format in a known location. This information fully describes the APIs exposed by the operating system and is stored in API metadata files. A language compiler or interpreter uses this API information to build a natural and familiar representation of the native system API in the target language. The language compiler or interpreter can read the API information at compile time and/or runtime. The metadata is used to allow an application to refer to named elements in the API. Projections are built that use the metadata to map named elements in the API to named elements in the target language, and to define wrappers that marshal data of those elements between the target representation and the native operating system representation.

15 Claims, 4 Drawing Sheets

(56) References Cited

U.S. PATENT DOCUMENTS

| | | | |
|---|---|---|---|
| 2003/0188043 | A1 | 10/2003 | Woodall et al. |
| 2005/0102129 | A1* | 5/2005 | Bond et al. ............... 703/26 |
| 2005/0114832 | A1 | 5/2005 | Manu |
| 2006/0179440 | A1 | 8/2006 | Besbris et al. |
| 2007/0039010 | A1 | 2/2007 | Gadre |
| 2007/0088710 | A1 | 4/2007 | Song et al. |
| 2007/0124334 | A1 | 5/2007 | Pepin |
| 2007/0156913 | A1 | 7/2007 | Miyamoto |
| 2008/0261689 | A1 | 10/2008 | Evans |
| 2009/0019380 | A1 | 1/2009 | Tanaka |
| 2009/0158238 | A1 | 6/2009 | Jung et al. |
| 2009/0199220 | A1* | 8/2009 | Bahlke et al. ............ 719/330 |
| 2010/0057784 | A1 | 3/2010 | Kapadia et al. |
| 2010/0058305 | A1 | 3/2010 | Jones |
| 2010/0275180 | A1 | 10/2010 | Alex |
| 2010/0299660 | A1 | 11/2010 | Torgersen et al. |
| 2011/0072424 | A1 | 3/2011 | Choi et al. |

OTHER PUBLICATIONS

"International Search Report", Mailed Date: Sep. 28, 2012, Application No. PCT/US2011/055700, Filed Date: Oct. 11, 2011, pp. 8.

Nguyen, et al., "A Framework for Diversifying Windows Native APIs to Tolerate Code Injection Attacks", Retrieved at <<http://mu.cs.ucdavis.edu/~fhsu/papers/aslaccs07.pdf>>, Proceedings of the 2nd ACM symposium on Information, computer and communications security, Mar. 20-22, 2007, pp. 3.

"Inside Windows Native API #1", Retrieved at <<http://katalog.egloos.com/2583336>>, Jul. 24, 2006, pp. 6.

"Building the Componentized Operating System in Microsoft Windows CE 2.1", Retrieved at <<http://msdn.microsoft.com/en-us/library/ms834182.aspx>>, Apr. 2000, pp. 5.

Ionescu, Alex, "Native Development Kit Readme", Retrieved at <<http://native-nt-toolkit.googlecode.com/svn/trunk/ndk/readme.txt>>, Retrieved Date: May 3, 2011, pp. 2.

Kloss, Guy K., "Source Code: Automatic C Library Wrapping—Ctypes from the Trenches", Retrieved at <<http://ojs.pythonpapers.org/index.php/tppsc/article/view/69/72>>, The Python Papers Source Codes, vol. 1, Sep. 16, 2009, pp. 1-14.

Heidrich, et al., "Automatic Generation of Tcl Bindings for C and C++ Libraries", Retrieved at <<http://citeseerx.ist.psu.edu/viewdoc/download?doi=10.1.1.33.902&rep=rep1&type=pdf>>, In Proceedings of the Tcl/Tk Workshop, Jul. 1995, pp. 9.

Emery, David, "Standards, APIs, Interfaces and Bindings", Retrieved at <<http://www.acm.org/tsc/apis.html>>, Retrieved Date: May 5, 2011, pp. 4.

"Microsoft.SqlServer.Server Namespace", Retrieved at <<http://msdn.microsoft.com/en-us/library/microsoft.sqlserver.server.aspx>>, Retrieved Date: May 5, 2011, pp. 3.

"International Search Report", Mailed Date: Sep. 19, 2012, Application No. PCT/US2011/055704, Filed Date: Oct. 11, 2011, pp. 9.

USPTO, Non-final Office action in U.S. Appl. No. 13/223,291, dated Jan. 30, 2013.

USPTO, 1st notice of allowance in U.S. Appl. No. 13/223,291, dated Jul. 17, 2013.

USPTO, 2nd notice of allowance in U.S. Appl. No. 13/223,291, dated Nov. 4, 2013.

* cited by examiner

PROJECTING NATIVE APPLICATION PROGRAMMING INTERFACES OF AN OPERATING SYSTEM INTO OTHER PROGRAMMING LANGUAGES

BACKGROUND

An operating system typically has several application programming interfaces that allow applications to access functionality supported by the operating system. Such APIs are typically specified by an operating system using a named file or object in a computer programming language. For example, the C programming language uses header files that may have a name such as "interface.h". Similarly, in C# a mechanism called "P/Invoke" signatures is used to access operating system APIs. A person writing a computer program that will make use of an operating system API typically includes a reference to a named API file or object in the program, or uses another mechanism provided by the programming language. That program, for example, then includes calls to functions defined by that API, in the syntax used by that API.

APIs defined in this manner cannot be directly accessed by languages other than the languages they are written in. To be made accessible to programs written in other languages, APIs are "wrapped." This wrapping typically has to be done manually per API and per language and requires deep understanding of both the target language and the API and operating system. Consequently, many operating system APIs are unavailable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When the operating system is built, information about the APIs is generated and stored in a known format in a known location within the operating system. This information fully describes all the APIs exposed by the operating system. This includes, but is not limited to, information about named elements of the API, of a variety of types, such as basic types, enumerated types, structures, delegates, interfaces, classes, methods, properties and events. This information is stored in API metadata files.

A language compiler or interpreter uses this API information to build a natural and familiar representation of the native system API in the target language. This representation varies from language to language (as what is natural and familiar varies from language to language). The language compiler or interpreter can read the API information at compile time and/or runtime, whatever is most appropriate for the language in question. For example, a statically compiled language like C++ would consume the metadata purely at compile time while dynamic language like Python or JavaScript would consume the metadata purely at runtime. An environment like .NET or Java would likely consume the metadata both at compile and runtime. The metadata is used to allow an application to refer to named elements in the API. Projections are built that use the metadata to map named elements in the API to named elements in the target language, and to define wrappers that marshal data of those elements between the target representation and the native operating system representation.

Accordingly, in one aspect, metadata describing application programming interfaces of an operating system is stored in memory. Given an indication of a named element in a program in a programming language, referring to an element of one of the application programming interfaces, the named element is projected into the programming language using the metadata. Projection can occur during compilation or interpretation of the program. Projection can include creating code that creates one or more elements in the programming language, and marshaling data for the created elements according to type. Interfaces, including their methods, properties and events, can be so projected. Projection also can include propagating exceptions from the operating system to the application.

Such projection of the operating system APIs into other languages can be embodied in a computer-implemented process, an article of manufacture include one or more computer storage media, or a computing machine.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which such projection of native system API's into other languages can be implemented.

Figure 1:
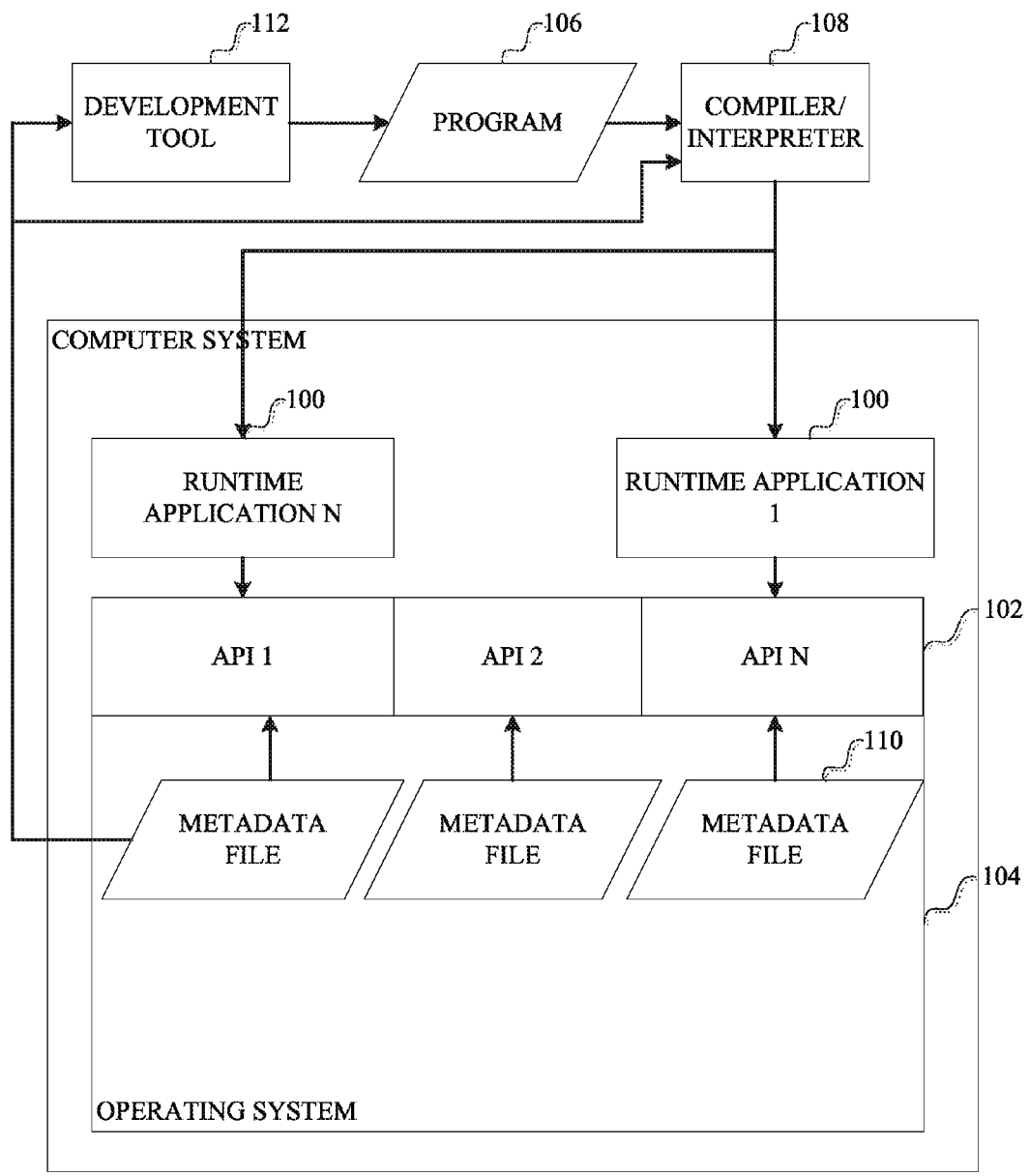
FIG. 1 is a block diagram of a system that includes projection of an API into other programming languages.

Referring to FIG. 1, a running application 100 accesses native system APIs 102 of an operating system 104 during runtime. In order for such application to have such functionality, a program 106 is written typically using a development tool 112, such as an editor. Such programs are either compiled or interpreted by a compiler or interpreter 108 of the language to provide the runtime application 100. The development tool 112, and compiler or interpreter 108, access metadata 110 that fully describes the APIs 102 of the operating system. The development tool 112 assists a developer in writing programs, but informing the developer of available native system API's, via the metadata, and allowing those APIs to be accessed using the developer's programming language. The compiler or interpreter embodies a projection of the native system APIs into the developer's programming language using the metadata. In particular, named elements in the API are mapped to named elements in the target language, and values in those elements are marshaled between formats used by the target language and the operating system.

Building such a system begins with building an operating system with API's described with metadata. The metadata represents each named element of an API description in a programming language independent form. This metadata provides a complete description of the interface. The combined system metadata can be stored in a series of metadata files in the ECMA-335 CLI format, but the specific format is immaterial to the invention.

Given this context, an example implementation of such a system will be described in more detail in connection with FIGS. 2-4.

Figure 2:
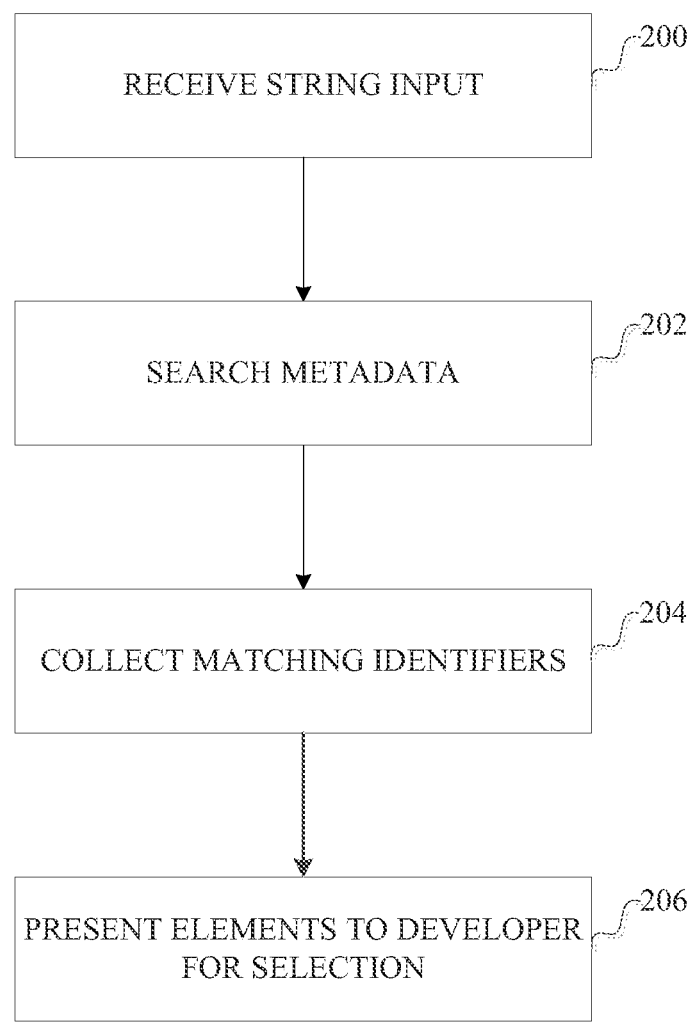
FIG. 2 is a flow chart illustrating an example operation of a development tool.

In FIG. 2, an example of operation of a development tool will now be described. A developer commonly uses a form of development tool, such as an editor, when writing a computer program. This editor can do a variety of tasks, such as verifying syntax and proposing completions to strings entered by the developer. In this environment, the metadata describing the operating system application programming interfaces can be used in a variety of ways. In particular, it can be used to allow the developer to discover available APIs. The development tool receives 200 a string input, such as a keyword that might be used in an API as an identifier (such as "Mouse") or a name space (such as the name of the operating system). The metadata can be searched 202 to identify elements having the received input as part of an identifier or name space. Identifiers for the set of matching elements can be collected and returned 204 to the development tool. The development tool can present 206 the elements to the developer for selection, and use information from the metadata to present such elements in a format appropriate for the computer language the developer is using.

Figure 3:
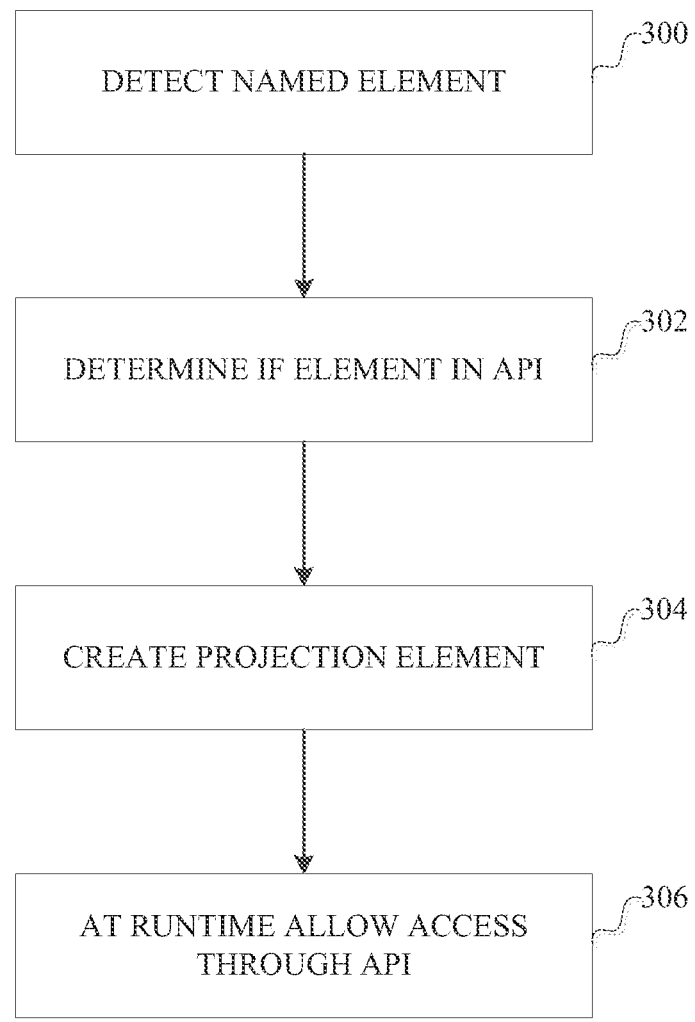
FIG. 3 is a flow chart illustrating an example operation of a compiler or interpreter.

Referring now to FIG. 3, an example of operation of a language compiler or interpreter will now be described. In processing a computer program, whether to compile or interpret it, a sequence of elements of the computer program is detected 300. Whether an element of the computer program is a reference to the API of the operating system is determined 302. For example, this can be determined by looking up the element in the metadata. A projection element is created 304, using the metadata, which allows data to be exchanged between the computer program and the operating system. In particular, the compiler or interpreter implements a projection of the named element in the operating system API to a named element in the target language. The metadata allows an object to be created and values to be marshaled between the data format used by the program and the format used by the operating system. At runtime, this element allows the program to access 306 the API of the operating system and marshal data between the application and the operating system.

Having now described the general operation of such a system, a specific example will now be described. In particular, more details of an example projection between the metadata describing the API and a computer language specific representation of the elements of the API will now be described.

The following description is merely one possible implementation and is not considered to be limiting of the invention. In particular, it should be understood that the following is merely an example of a language projection that could be implemented, and that other implementations for this language are possible, and other projections into other languages are possible.

In this example, JavaScript is the programming language into which the native system APIs will be projected using the metadata. In the examples below, an explanation is given for how some kinds of elements are projected into the JavaScript programming language.

When a script attempt to create an instance of a particular object defined by an operating system API, a Projector object is responsible for accessing the metadata to create marshaling stubs that convert data between different types, possibly involving creating proxy objects, and for dispatching method calls, managing events and managing callback functions.

For named elements that are basic types, such as integers, strings, and the like, the following are ways of projecting those API elements into JavaScript.

The operating system has several signed and unsigned integer types, such as an unsigned integer of one byte (UInt8), unsigned integer of four bytes (UInt32), a signed integer of four bytes (Int8), and signed and unsigned integers of eight bytes (UInt64 and Int64). Named elements of these types are projected as JavaScript Number values. When a JavaScript Number is marshaled into the operating system value, then the values are type coerced into a JavaScript number, and then the process defined by the ES5 ToInt32 specification is followed. For UInt8, the result has modulo $2^8$ applied. For an Int32, modulo $2^16$ is applied. For UInt32, modulo $2^32$ is applied.

A 64-bit integer being marshaled into JavaScript value is represented as a standard Number value if it falls in the range $[-2^53, 2^53]$, if signed, or $[0, 2^53]$ if unsigned. If it falls outside this range, it is represented as a Number value with a custom backing store that maintains the full 64 bits of integer data. Mathematical operations on these custom Number values cause the value to be coerced into a standard Number representation in the range $[-2^53, 2^53]$ or $[0, 2^53]$ if unsigned. If the value is outside this range, a Type Error will be raised. A JavaScript value being marshaled into an 64-bit integer is directly assigned if it is a projected value itself; otherwise, the result of applying a EC5 "ToInteger" conversion on the value is passed.

Named elements of the operating system API that are characters (represented by 16-bit unicode), strings or global unique identifiers (GUIDs) can be represented as JavaScript strings and are projected into named strings in JavaScript.

A character being marshaled into JavaScript is converted into a JavaScript string value containing the single character represented by the unicode value. A JavaScript value being marshaled into a character is type coerced into a JavaScript string via the ES5 ToString operation and the first character is kept. The single character is then passed as the Char16 value.

A string being marshaled into JavaScript is converted to a JavaScript String. A JavaScript value being marshaled into a string is type coerced into a JavaScript string.

A GUID being marshaled into a JavaScript value is converted into a string format. A JavaScript value being marshaled into a GUID is type coerced into a string and then parsed into a format used by the operating system.

The operating system can have an API with a named element that is a DateTime struct that represents a point in time or a TimeSpan struct that represents a quantity of time. The DateTime structure can be projected into JavaScript as a Date instance with a backing store matching the DateTime struct data (which has a different range and precision than the Date instance). A TimeSpan struct is converted to milliseconds and returned as a JavaScript Number. Similarly, a JavaScript number can be converted from milliseconds to a 100-nanosecond units to pass as a TimeSpan struct.

It should be noted that, by interpreting metadata, a projection can also remap types from the native environment into the existing types in the language projection in some cases. For example, this is possible and desirable when the types in native API and language projections have a compatible data layout, which can readily occur with fundamental data types. With the metadata mapping, a projection can simply redirect all operations, such as methods or properties on the language types, to the native types directly. This makes uses of those types more natural and familiar to the language developers.

For example, a DateTime structure remapping can be implemented in this manner. In the native API, a DateTime structure is exposed as Windows.Foundation.DateTime in the metadata without any additional operations. In a C# projection, this type can be redirected to System.DateTimeOffset in C# with rich support.

As another example, if a named element in an API is a method, it has a value HRESULT as its return type, which is converted to exceptions in JavaScript. A returned HRESULT is checked for success by the JavaScript engine. If the HRESULT indicates a failure, the JavaScript engine throws an exception on the JavaScript side. Thus, for JavaScript invoking methods of an operating system API, an HRESULT failure is surfaced as a JavaScript Exception. For API methods consuming JavaScript methods (such as for call backs or delegates described below), the JavaScript method call is wrapped in an exception block (or the equivalent as provided by the JavaScript hosting API) so that caught exceptions can be propagated as HRESULTS. However, the operating system also allows HRESULTs to be in the in or out parameter positions of methods and properties. In these cases, HRESULTS are marshaled as an unsigned 32-bit value (as described above).

For named elements in an API that are enumerated types, which is a set of named constants, these are represented in JavaScript as an object that contains a read only field for each named value.

For named elements in an API that are "structs", a collection of named data fields, these are represented in JavaScript as JavaScript objects. A Struct being marshaled into JavaScript is converted into an object. Each named field in the struct becomes a named property in the JavaScript object. The value of each named field in the struct is marshaled as per the underlying type of the field. A JavaScript Value that is an object type can marshaled into a Struct. The JavaScript Object or its prototype contains a named field for each named field of the struct and the value of each named field is marshaled according to the underlying type. Extra fields in the JavaScript Object that don't have equivalent in the operating system API struct are ignored. If the marshalling of any struct value fails, a marshalling error is returned.

In this example, the operating system does not have a type for an array, but instead allows an arguments to methods to be a pair of an unsigned integer length representing a number of elements, not bytes, in an array, followed by a pointer to the array's first element.

When marshaling an array into Javascript, an object is created with the following characteristics. The object has properties for each integer value between 0 and the length of the array, minus 1, which are enumerable, writable and not configurable, and a 'length' property initially set to the length of the vector, which is not writable, not enumerable and not configurable. Its prototype is the Array prototype object. Its operation on index properties sets the specified index on the underlying native array. Its operations on index properties indexes into the underlying native array. It does not have as "Array". When marshaling a JavaScript object, if the object has "Array", then the array is copied into a native array and a reference to this array is passed on. If the object was a projected array, then the underlying native array is passed on.

The API also can have named elements that are delegates, or callback functions, which is a reference to a single invokable method. These can be projected into JavaScript as callable objects. The Projector wraps the callback delegate in a custom marshaling object.

A delegate being marshaled into JavaScript is wrapped in a JavaScript function object. When the function object is invoked, the arguments are marshaled into the equivalent parameter types as specified by the delegate and then the wrapped delegate object is invoked. If any argument fails to marshal, the delegate call fails. If there are fewer JavaScript arguments than delegate in parameters, the delegate call fails. Extra JavaScript arguments beyond the delegate in parameters are ignored. After the delegate is invoked, the out parameters are marshaled into JavaScript types. If any out parameter fails to marshal, the delegate call fails. The out parameters are then marshaled to JavaScript values and returned.

If a native JavaScript function object is being marshaled into a delegate, that callable object is wrapped in a delegate of the corresponding delegate type. When the delegate is invoked, the in parameters are marshaled into JavaScript types and then the JavaScript function object is invoked. If any argument fails to marshal, the delegate call fails. After the delegate is invoked, the return value is mapped into the delegate's out parameters based on the following rules. First, if there are no out parameters, the return value from the JavaScript function object is ignored. Second, if the delegate specifies a single out parameter, the return value from the JavaScript function object is marshaled into that type. If that marshalling fails, the delegate call fails. Third, if the delegate specifies multiple out parameters, the return value from the JavaScript function object return value is an object with a named property for each out parameter. Each named property is marshaled into the type of the corresponding out parameter. If the return value is not an object, the delegate call fails. If the returned object doesn't contain a named property for each out parameter, the delegate call fails. If the returned object contains extra named properties that don't correspond to out parameters, they are ignored. If any named property fails to marshal to the corresponding out parameter type, the delegate call fails.

The following example illustrates metadata for a delegate called IString Collection, and pseudo-JavaScript code that creates an instance of this delegate.

Example metadata:

```
[uuid(...)]
delegate HRESULT Comparer([in] HSTRING s1, [in] HSTRING s2,
        [out, retval] boolean* value)
interface IStringCollection
{
        HRESULT Sort([in] Comparer compare);
}
```

Pseudo-JavaScript:

```
//create an instance of a class that implements IStringCollection
strCol = getIStringCollection( )
strCol.sort(function (s1, s2) { return s1 > s2; });
```

Interfaces are not directly projected into JavaScript as objects. However, interfaces can be parameter and return types of the operating system API methods.

To provide a projection that is natural in the target programming language, in the examples above, members are projected into JavaScript have their names altered to camelCase, following a strong convention in JavaScript to use camelCase names for members. Types, which are akin to JavaScript constructor functions, are conventionally PascalCased and are projected in that form. Similarly, enum properties, struct fields, event names for the addEventListener pattern, have names in camelCase.

An interface instance that is not known based on static type information to be a representation of a runtime class, being marshaled into JavaScript, goes through the following steps. First, a call to the interface is made to obtain the runtime class name for the interface. If successful, the object is projected as a runtime class instance object (described below). Otherwise, the object is projected as though it were an instance of an unnamed runtime class that implements exactly the interface is known to implement and it's transitively required interfaces.

A JavaScript value being marshaled to an interface type is checked to see if it is a projected runtime class instance object or projected interface instance object. If it is a runtime class object, and the original value which that object proxies implements an interface type, the objects implementation of that interface is passed to the operating system. Otherwise, a type error exception is raised.

Objects in the operating system API may be instances of runtime classes. Runtime classes implement a set of one or more interfaces (defined below). The list of implemented interfaces of a running object can be determine either based on the metadata of the method that returned the running object or by access the runtime class name and looking up the metadata. Since JavaScript is a prototype based, dynamic language, it has no construct of classes. Class constructs are projected in JavaScript as objects.

Thus, operating system API objects are projected in JavaScript as objects. The union of methods, properties and events defined on all the implemented interfaces of the class represents the type members that are exposed as named properties available on the projected JavaScript object, via its prototype. Consumers of the JavaScript language projection can access any member of the class directly without concern regarding which interface the member is actually defined on.

JavaScript objects are dynamic, meaning that new properties can be added or removed on objects at any time. Projected objects can support adding new properties and methods, so long as pre-defined interface members are not overridden or deleted. In JavaScript terms, projected objects are extensible, but the collection of named type members is non-configurable. Projected objects have a prototype with the instance members defined on the collection of members from the runtime class-implemented interfaces.

Such interfaces, as noted above, have methods, parameters and events.

Methods at the language projection layer are implemented as a vtable with a slot per method. The metadata about an interface provides the method name as well as the names, types and direction (in/out) of the parameters. Methods are projected in JavaScript as callable properties on the projected runtime class or interface object. These properties are {Writable=false, Enumerable=true, Configurable=false}. When called, the arguments are marshaled according to their corresponding parameter types, the method is called with these values. The return value(s) are marshaled to a JavaScript value, with the JavaScript object returns as the value.

Properties at the language projection layer are implemented as get and/or set methods. Accessing the property value calls the get method while updating the property value invokes the set method. Properties can be read or write (i.e. get and set methods available) or read only (i.e. only get method available). Properties are projected in JavaScript as properties. Marshalling of the property value works as described above depending on the underlying property type.

Events at the language projection layer are implemented as add and remove event listener methods. The add method takes a delegate instance and returns data describing the listener, while the remove method takes the data describing the listener and returns nothing.

In JavaScript, any projected runtime class or interface object which has at least one event projected onto it gets two additional properties added to its prototype, addEventListener and removeEventListener. These properties are {Writable: false, Enumerable: true, Configurable: false} and are assigned to be callable objects.

The addEventListener function takes a string argument which represents the name of the event to listen to, a callback function to assign as the listener, and an optional third parameter which is ignored. This function calls the underlying add_Event method, passing the marshaled callback function as a delegate, and stores the resulting token in a map keyed by the reference identity of the callback function object.

The removeEventListener function takes a string argument which represents the name of the event to remove a listener from, a callback function which should be removed, and an optional third parameter which is ignored. This function looks up the callback function by reference identity in the map of stored tokens, and if a token is found, calls the underlying remove_Event method, passing the retrieved token.

When the event is fired, any JavaScript function objects passed as the callbacks will be invoked. The arguments passed to the function object will be the marshaled values of the arguments provided to the EventHandler delegate.

As shown by the foregoing, by having an API Projection layer for a language, named elements of an operating system API, as specified by metadata stored in the operating system, can be used to automatically create objects and marshal data between the operating system API format and the application programming language format. It should be understood that the foregoing is merely an example of projection between an example operating system and an example programming language and that the invention is not limited to this example.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 4:
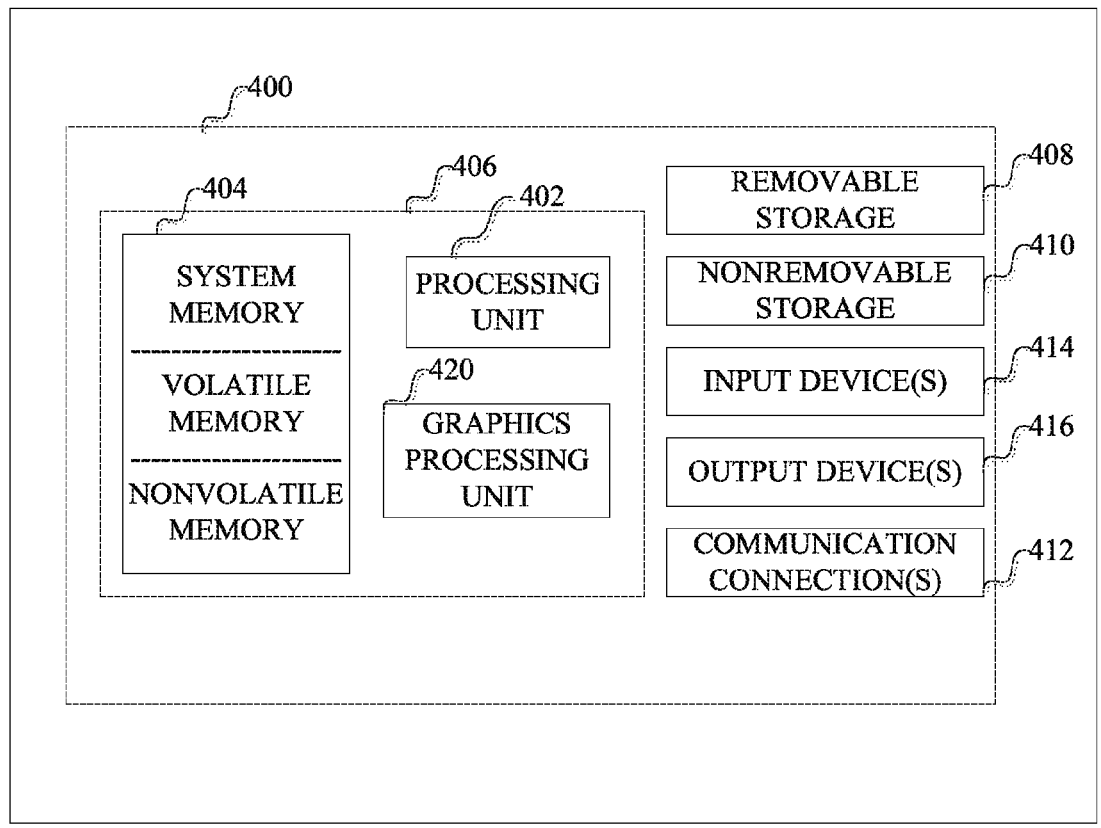
FIG. 4 is a block diagram of an example computing device in which such a system can be implemented.

FIG. 4 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 4, an example computing environment includes a computing machine, such as computing machine 400. In its most basic configuration, computing machine 400 typically includes at least one processing unit 402 and memory 404. The computing device may include multiple processing units and/or additional co-processing units such as graphics processing unit 420. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, computing machine 400 may also have additional features/functionality. For example, computing machine 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer program instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 400. Any such computer storage media may be part of computing machine 400.

Computing machine 400 may also contain communications connection(s) 412 that allow the device to communicate with other devices. Communications connection(s) 412 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 400 may have various input device(s) 414 such as a display, a keyboard, mouse, pen, camera, touch input device, and so on. Output device(s) 416 such as speakers, a printer, and so on may also be included. All of these devices are well known in the art and need not be discussed at length here.

This system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   receiving metadata into memory describing application programming interfaces of an operating system;
   receiving an indication of a named element in a program in a target programming language referring to an element of one of the application programming interfaces of the operating system; and
   using the metadata, creating a projection element in the program in the target programming language, the projection element being a projection of the element of the application programming interface of the operating system to the named element in the program, such that at runtime, the projection element in the program allows the program to access the application program interface of the operating system;
   wherein the projection element marshals data between an operating system representation and an application representation according to type;
   wherein the metadata is stored in a metadata file, wherein the metadata file describes elements of the application programming interface in a machine readable programming language independent format and is stored in a standard file format in a known location as part of the operating system.

2. The computer-implemented process of claim 1, wherein creating the project element comprises, when the program is compiled, creating code that defines one or more projection elements.

3. The computer-implemented process of claim 1, wherein creating the projection element comprises, when the program is interpreted, creating code that defines one or more projection elements.

4. The computer-implemented process of claim 1, wherein the projection element comprises an interface including methods, properties and events.

5. The computer-implemented process of claim 1, wherein the projection element propagates exceptions from the operating system to the application.

6. An article of manufacture comprising:
   a computer storage medium;
   computer program instructions stored on the computer storage medium which, when processed by a processing device, instruct the processing device to perform a process comprising:
   receiving metadata into memory describing application programming interfaces of an operating system;
   receiving an indication of a named element in a program in a target programming language referring to an element of one of the application programming interfaces; and
   using the metadata, creating a projection element in the program in the target programming language, the projection element being a projection of the element of the application programming interface of the operating system to the named element in the program, such that at runtime, the projection element in the program allows the program to access the application program interface of the operating system;

wherein projecting the projection element marshals data between an operating system representation and an application representation according to type;

wherein the metadata is stored in a metadata file, wherein the metadata file describes elements of the application programming interface in a machine readable programming language independent format and is stored in a standard file format in a known location as part of the operating system.

7. The article of manufacture of claim 6, wherein creating the projection element comprises, at compile time, creating code that defines one or more projection elements.

8. The article of manufacture of claim 6, wherein creating the projection element comprises, when the program is interpreted, creating code that defines one or more projection elements.

9. The article of manufacture of claim 6, wherein the projection element comprises an interface including methods, properties and events.

10. The article of manufacture of claim 6, wherein the projection element propagates exceptions from the operating system to the application.

11. A computing machine comprising:
one or more processors;
one or more computer storage media;
computer program instructions stored on the computer storage medium which, when processed by a processing device, implement a language projection between application programming interfaces of an operating system and applications in a target programming language;
wherein the application programming interfaces of the operating system are described by metadata stored in memory; and
wherein the language projection receives an indication of a named element in a program in a target programming language referring to an element of one of the application programming interfaces of the operating system, and, using the metadata,
creates a projection element in the program in the target programming language, the projection element being a projection of the element of the application programming interface of the operating system to the named element in the program, such that at runtime, the projection element in the program allows the program to access the application program interface of the operating system;
wherein the projection element marshals marshaling data between an operating system representation and an application representation according to type;
wherein the metadata is stored in a metadata file, wherein the metadata file describes elements of the application programming interface in a machine readable programming language independent format and is stored in a standard file format in a known location as part of the operating system.

12. The computing machine of claim 11, wherein creating the projection element comprises, at compile time, creating code that defines one or more projection elements.

13. The computing machine of claim 11, wherein creating the projection element comprises, when the program is interpreted, creating code that defines one or more projection elements.

14. The computing machine of claim 11, wherein the projection element comprises an interface including methods, properties and events.

15. The computing machine of claim 11, wherein the projection element propagates exceptions from the operating system to the application.

* * * * *